United States Patent [19]

Cunningham. Donald J. et al.

[11] Patent Number: 5,109,772
[45] Date of Patent: May 5, 1992

[54] FLASH IGNITION SYSTEM

[75] Inventors: Donald J. Cunningham, North Ogden; Bradley W. Smith, Ogden, both of Utah

[73] Assignee: Morton International, Inc., Chicago, Ill.

[21] Appl. No.: 643,626

[22] Filed: Jan. 22, 1991

[51] Int. Cl.$^5$ .................. B60R 21/28; C06C 5/06; F42B 3/10
[52] U.S. Cl. .................. 102/275.11; 280/741; 422/166
[58] Field of Search .................. 102/275.11, 530, 531; 280/741; 422/166

[56] References Cited

U.S. PATENT DOCUMENTS

| | | | |
|---|---|---|---|
| 4,005,876 | 2/1977 | Jorgenson et al. | 280/741 |
| 4,380,346 | 4/1983 | Davis et al. | 422/166 |
| 4,878,690 | 11/1989 | Cunningham | 280/741 |
| 4,890,860 | 1/1990 | Schneiter | 422/166 |
| 4,923,212 | 5/1990 | Cuevas | 280/741 |
| 4,948,439 | 8/1990 | Poole et al. | 280/741 |
| 4,950,458 | 8/1990 | Cunningham | 422/166 |
| 4,998,751 | 3/1991 | Paxton et al. | 280/741 |
| 5,033,390 | 7/1991 | Minert et al. | 280/742 |

Primary Examiner—David H. Brown
Attorney, Agent, or Firm—Gerald K. White

[57] ABSTRACT

Because of the length of the airbag gas generator that is used on the passenger side of an automotive vehicle, it has been extremely difficult and expensive to provide an ignition system that would ignite solid gas generant pellets and wafers uniformly throughout the entire length thereof. In order to effect ignition of all pellets throughout the length of the gas generator combustion chamber substantially simultaneously, there is positioned in concentric relation therein an elongated $BKNO_3$ dipped igniter tube having similarly dipped disks positioned thereon in spaced relation, transversely thereof, $BKNO_3$ powder initiated by a squib directs fire down the igniter tube to produce a rapid flash of fire that ignites the $BKNO_3$ dipped igniter tube and disks and surrounding gas generant pellets. The hot gas from the gas generant pellets is cooled and filtered by a screen pack assembly prior to exiting through holes in the cylindrical wall of the gas generator and directed to an airbag for inflation.

10 Claims, 2 Drawing Sheets

FLASH IGNITION SYSTEM

BACKGROUND OF THE INVENTION

1. Field of the Invention

The present invention relates to an improvement in the mechanism for igniting a gas generator of the type that utilizes the combustion of a solid fuel gas generant composition for the generation of gas to inflate an automotive passive restraint inflatable crash protective airbag or cushion. The invention is particularly advantageous for use in a gas generator provided on the passenger side of an automotive vehicle.

2. Description of the Prior Art

Typically, the solid fuel gas generant material used in airbag gas generators is in the form of pellets or wafers. Because of the length of the passenger airbag gas generator, it has been extremely difficult and expensive to provide an ignition system that is operative to ignite such gas generant material uniformly throughout the entire length of the gas generator. Rapid deflagration cord (RDC) and "first fire" applications (in which rapid burning material is placed adjacent the solid fuel gas generant material) are in use, but they are difficult to manufacture and expensive.

Thus, there is a need and a demand for an improved ignition system for the passenger airbag gas generator that is operative to ignite the solid fuel gas generant material uniformly throughout the entire length of the gas generator, and further, that is characterized by the ease of manufacture and reduction in manufacturing cost thereof.

SUMMARY OF THE INVENTION

An object of the invention is to provide an improved ignition system having particular utility in an airbag gas generator having an elongated combustion chamber containing a solid fuel gas generant material.

Another object of the invention is to provide such an improved ignition system that produces an instantaneous flash of fire throughout the length of the elongated gas generator combustion chamber to effect instantaneous, and thereby uniform, ignition of all of the gas generant material therein.

A more specific object of the invention is to provide a flash ignition system for use with a gas generator that employs solid fuel gas generant material to effect the inflation of a protective bag to cushion a passenger from impact with the structure of a vehicle in the event of a crash, which gas generator includes a tubular housing having an elongated chamber therein containing the solid fuel gas generant material with the tubular portion of the housing having aperture means therein for directing generated gases to the protective bag, comprising:

an elongated perforated igniter tube positioned in the elongated chamber in the tubular housing with the solid fuel gas generant material therein distributed throughout the length of the chamber in surrounding relation to said igniter tube, said igniter tube having a first end and a second end and being composed of carbon steel iron phosphate coated or aluminized with a further coating of $BKNO_3$ deposited thereon, means including explosive $BKNO_3$ powder positioned in the tubular housing adjacent the first end of said igniter tube, and initiator means for igniting the explosive $BKNO_3$ powder. Explosive $BKNO_3$ "powder," as the term is used herein, is a well-known mixture of boron and potassium nitrate nominally used in proportions of 25% by weight of boron and 75% of potassium nitrate as disclosed in U.S. Pat. No. 3,985,076 (see column 2, lines 59-62) and in U.S. Pat. No. 4,547,342 (see column 3, lines 17-20).

A further object of the invention is to provide such an improved ignition system that is characterized by the ease and economy of manufacture thereof.

In accomplishing these and other objectives of the invention, there is provided an ignition system having particular utility for use in the gas generator of a passenger automotive airbag restraint system. The ignition system includes a flash igniter tube that has been especially treated and extends for substantially the full length of the combustion chamber of the inflator, which chamber is elongated. The igniter tube is positioned in the combustion chamber concentrically thereof, and is surrounded by a charge of solid gas generant material which, typically, is in pellet or wafer form. The combustion chamber is enclosed over the length thereof by an inner perforated tube or basket that is located concentrically relatively to the igniter tube and a tubular perforated outer housing. In the space between the perforated basket and the inner wall of the tubular outer housing there is provided a screen pack or gas filtering assembly and a spacer screen. Positioned in the combustion chamber in surrounding relation therewith may be several perforated flash igniter disks.

The flash igniter tube may be made of perforated carbon steel or carbon steel rolled and welded into a tube. In each case the flash igniter tube is iron phosphate coated or aluminized to suitably prime the surface of the tube and then treated by immersion in a solution comprising a mixture of 40% water and 60% $BKNO_3$ powder, followed by air drying thereof, to cause a coating of $BKNO_3$ to be deposited on the surfaces thereof, as described hereinafter. Priming the surface of the tube promotes adherence of the $BKNO_3$ deposit thereto.

The flash ignition system is operative when activated to provide a flash of fire instantaneously throughout the length of the combustion chamber of the gas generator. Such flash of fire produces ignition simultaneously of all of the gas generant material that is distributed along the length of the combustion chamber.

In one embodiment of the invention, electrical current supplied from an electrical energizing circuit including a crash sensor activates or fires an initiator or squib into a charge of $BKNO_3$ powder that is provided in one end of the igniter tube. The fire is directed down the $BKNO_3$ solution dipped igniter tube by the squib holder and base of the gas generator. A rapid flash of fire from the igniter tube ignites the gas generant material and spaced $BKNO_3$ disks that are positioned along the igniter tube in contact with the gas generant material. The hot gas from the gas generant material is cooled and filtered by the screen pack assembly prior to exiting the outer tubular housing of the gas generator for airbag inflation.

In another embodiment of the invention, it is contemplated that the initiator or squib may be activated responsively to a crash by pyrotechnic means instead of electrical means. Since such pyrotechnic means are known in the prior art and form no part of the present invention, no further description thereof is provided herein.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification and in which like parts are designated by the same reference numerals, of which drawings.

DESCRIPTION OF THE PREFERRED EMBODIMENT

Figure 1:
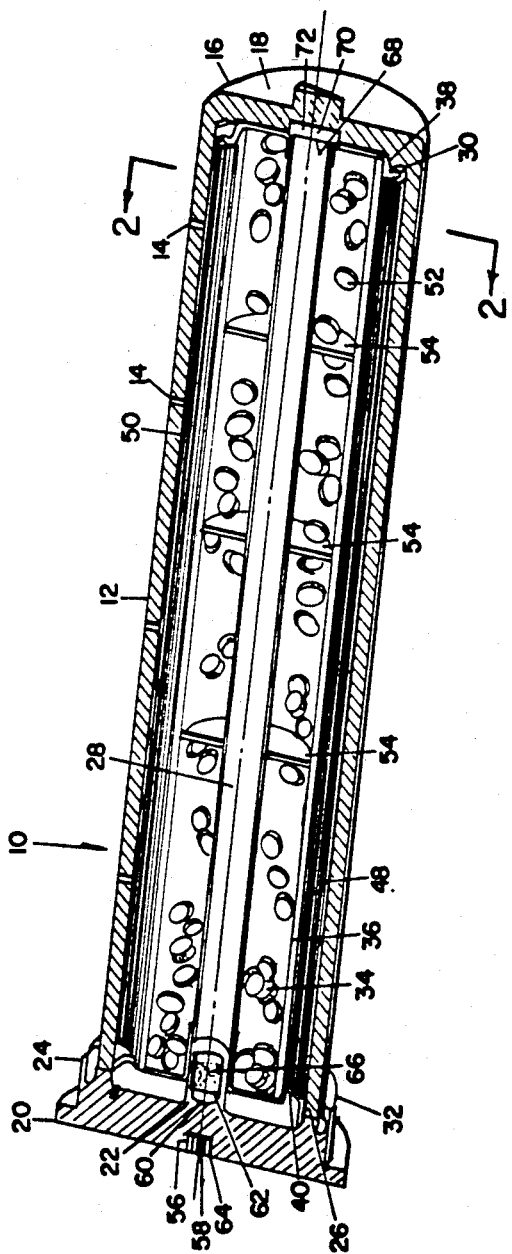
FIG. 1 is a longitudinal cross sectional view of a gas generator in which the flash ignition system of the invention is embodied.

The gas generator indicated at 10 in FIG. 1 of the drawings is applicable for use in an automotive vehicle cushion restraint system that includes an airbag (not shown). The inflator 10 is particularly adapted for use on the passenger side of the vehicle, being mounted in an appropriate manner in or on the dashboard of the vehicle.

The gas generator 10, as shown, is elongated. In one embodiment, the generator 10 has a length of 11.82 inches (30.02 cm) and an overall diameter of 2.43 inches (6.17 cm). An elongated tubular outer housing 12 for the generator 10 may be made of aluminum. For most of the length thereof, the outer housing has a thin cylindrical wall in which a plurality of gas exit outlets of holes 14 are provided.

One end 16 of the housing 12 is closed by a base member 18 which, as shown in FIG. 1, may be formed integrally therewith. The other end 20 of the housing 12 is closed by a squib holder and base member 22. Member 22 may be attached in a sealing manner to the end of housing 12 by a suitable process such as by inertia welding, as illustrated by welds 24. A welding process that may be employed is described in U.S. Pat. No. 4,547,342 to Adams et al. which is assigned to the assignee of the present invention, the disclosure of which patent, by reference, is incorporated herein. Adjacent the periphery of the inner surface of base member 22 is a circular ridge 26 that is welded to the adjacent end of the housing 12 during this process.

Extending generally over the length of tubular member 12 and centrally located thereof so as to be generally concentric therewith is an elongated generally cylindrical perforated tubular member 28. Member 28 may be composed of carbon steel which has been phosphate coated or aluminized. After treatment in a manner described hereinafter, member 28 functions as a flash igniter tube and is so referred to hereinafter.

A tube locator cap 30 is positioned adjacent the inner side of base member 18 and a retaining disk and tube locator cap 32 is positioned adjacent the inner side of the base member 22 for facilitating positioning of the flash igniter tube 28 for retaining it in place. The disk 32 serves also to keep gas generant material 34 in place within the housing 12, during the assembly operation, suitably spaced apart from the base member 22 which spins relatively to the housing 12 during the inertia welding operation.

Also extending generally over the length of the tubular housing 12 and positioned concentrically therein is an elongated perforated cylindrical tube or basket 36 which may be composed of mild steel or other material. Basket 36 is positioned concentrically relatively to the flash igniter tube 28 and housing 12 by means of a crimp 38 in locator cap 30 and a crimp 40 in disk and locator cap 32.

Figure 2:
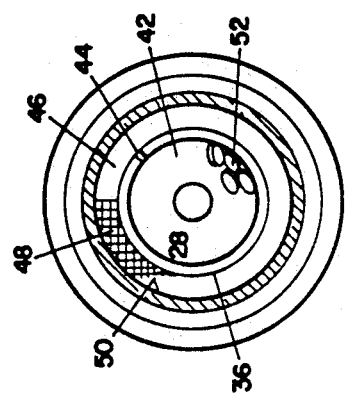
FIG. 2 is a cross sectional view of the gas generator of FIG. 1 taken along the lines 2—2.
Figure 3:
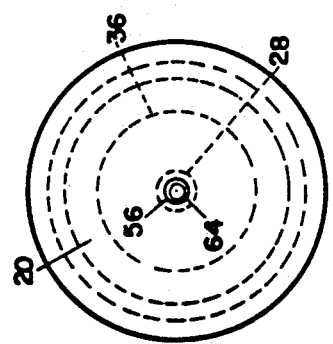
FIG. 3 is an end view of the gas generator as seen from the left end of FIG. 1.

Gas generant material 34 is contained in an elongated space or region 42 having an annular cross section, as best seen in FIG. 2, between the flash igniter tube 28 and the basket 36. The annular space 42 forms and is referred to hereinafter as the combustion or gas generant chamber of the inflator 10.

Generated gases flow from the combustion chamber 42 through perforations 44 in the perforated basket 36 into an annular space 46 between the basket 36 and the inner wall of the housing 12. A gas filtering assembly 48 is positioned in the annular space 46. Positioned between the filtering assembly and the inner wall of the housing 12 is a heat seal foil barrier 50 which may have a thickness of 0.004 inches (0.010 cm).

The gas filtering assembly is annular in cross section, and by way of example but not limitation, may include, beginning with the innermost layer, next to the basket 36, two wraps of nickel coated carbon or stainless steel 30 mesh screen, then metal filter such as 80×700 or 50×250 mesh stainless steel or 40×180 mesh nickel coated carbon, then a single wrap of ceramic filter paper 0.080 inches (0.020 cm) thick, followed by two wraps of 30 mesh stainless steel or nickel coated carbon. Lastly, a wrap of 5 mesh stainless steel or nickel coated carbon may be provided adjacent the wall of the housing 12 to allow space around exit passages or holes 14 therein for the free passage of the generated gases. The gas filtering assembly 48, however, may contain any other suitable filtering arrangement.

Adjacent the inner wall of the perforated basket 36 within the combustion chamber 42 may be disposed two or three wraps of 30 mesh nickel coated carbon or stainless steel cooling screen (not shown).

Disposed within the combustion chamber 42 is the gas generant material 34 comprising a charge of solid pyrotechnic material which, in FIG. 1, is shown to be in the form of pellets 52. Pellets 52 may be similar to the pellets of gas generant material disclosed in the aforesaid U.S. Pat. No. 4,547,342.

Suitably spaced flash igniter disks 54 composed of 30 mesh carbon steel screen may be positioned radially within combustion chamber 42. The flash igniter disks 54 may have the shape of washers having inner and outer diameters which are substantially the same as the inner and outer diameters, respectively, of the combustion chamber 42. In other words, the disks 54 have substantially the same shape as the cross section of the combustion chamber 42 taken in a radial plane.

The gas generant material 34 may be one of a number of compositions meeting the requirements of burning rate, non-toxicity, and flame temperature. One composition that may be utilized is that described in U.S. Pat. No. 4,203,787 to Schneiter et al. Another composition that may be used advantageously is that described in U.S. Pat. No. 4,369,079 to Shaw. Both of these patents, the disclosures of which by reference are incorporated herein, are assigned to the assignee of the present invention.

The present invention is not limited to any particular composition or geometrical shape of the gas generant material 34. Thus, the gas generant material 34 may be composed of a plurality of wafers which are arranged in a side-by-side array and spaced apart from each other. The wafers, which are not illustrated, may have the shape of washers similarly to the flash igniter disks 54, with the inner and outer diameters thereof being generally the same as the inner and outer diameters, respectively, of the annular combustion chamber 42.

Pressed into an aperture 56 in the outer surface of base member 22 is a suitable plastic shorting clip 58 which includes a suitable retaining spring (not shown). The shorting clip 58 may be similar to that disclosed in U.S. Pat. No. 4,369,707 to Budde, which disclosure by reference is incorporated herein. Secured within the clip 58 and extending into the adjacent end of the flash igniter tube 28 is an initiator assembly 60 including a suitable squib 62. The squib 62 is connected by a pair of terminals, one of which is shown at 64, to electrical lead wires (not shown) which extend outwardly from the base member 22 to a source of electrical power for initiating ignition of the inflator 10.

Contained within the initiator assembly 60 is a suitable pyrotechnic material 66 which may be any of a variety of compositions meeting the requirements for rapid ignition and non-toxicity. A typical material for this use may be $BKNO_3$ powder. The pyrotechnic material 66 is ignitable by the squib 62.

A container 68 is provided in a recess 70 in the inner wall of base member 18 in alignment with the adjacent end of the flash igniter tube 28. Container 68 holds or contains auto ignition granules 72 to define an auto ignition device similar to the auto ignition device disclosed in U.S. Pat. No. 4,561,675 to Adams et al. and assigned to the assignee of the present invention, which patent, by reference, is incorporated herein. The granules 72 are ignitable to cause the pyrotechnics in the inflator 10 to function when the device is subjected to a high temperature environment, such as a bon fire, at a temperature in the 350° F. range instead of the 650° F. range at which the pyrotechnics would ignite if the auto ignition device were not provided. This enables the use of aluminum for the inflator housing 12, the aluminum having sufficient high temperature properties to contain the internal auto ignition pressures that are produced at a temperature of 350° F. but not at 650° F. The housing 12 is preferably composed of aluminum in order to minimize the weight of the gas generator 10.

By way of example and not limitation, it is noted that the flash igniter tube 28 may comprise an eleven (11) inch (27.94 cm) long 21 gage hollow cylindrical body of carbon steel having an outside diameter of three-eighths ($\frac{3}{8}$) of an inch (0.95 cm) that has been coated with iron phosphate or aluminized and into which perforations have been introduced by piercing the cylindrical wall thereof. Alternatively, the flash igniter tube 28, again having a length of eleven (11) inches (27.94 cm), may be made of 30 mesh carbon steel screen coated with iron phosphate or aluminized, rolled and welded into a tube having an outside diameter of three-eighths ($\frac{3}{8}$) of an inch (0.95 cm).

Figure 4:
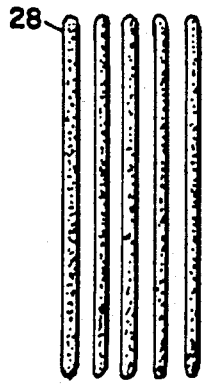
FIG. 4 illustrates an array of five (5) flash igniter tubes that have been prepared for solution treating according to the invention.
Figure 5:
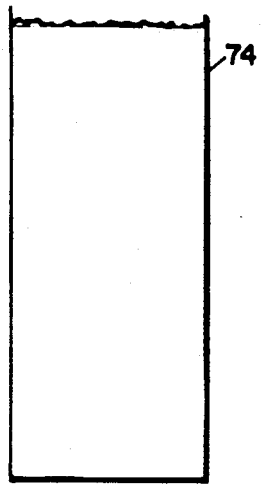
FIG. 5 shows a tank containing an agitated BKNO₃ solution in which the flash igniter tubes are to be dipped for treatment.
Figure 6:
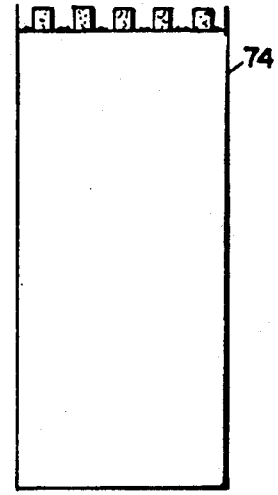
FIG. 6 shows the array of five (5) flash igniter tubes immersed in the solution in the tank of FIG. 5.
Figure 7:
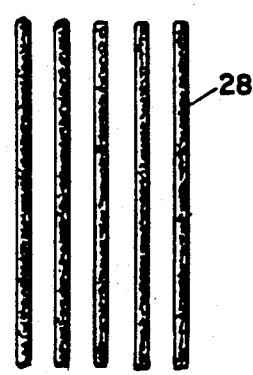
FIG. 7 shows the array of flash igniter tubes being air dried after retraction from the solution in the tank of FIG. 6.

In accordance with the invention, the flash igniter tube 28, as described above, is treated in a solution comprising an agitated mixture of 40% water and 60% $BKNO_3$ powder before being assembled in the gas generator 10. For reasons of efficiency and economy it is desirable to so treat a plurality of flash igniter tubes at the same time. Thus, as illustrated in FIGS. 4, 5 and 6, a spaced array of flash tubes 28, specifically five (5) such tubes are dipped in a tank 74 containing an agitated mixture of water and $BKNO_3$ in the proportions described. After a delay of about two (2) seconds, the tank 74 and dried in circulating warm air as illustrated in FIG. 7.

It is noted that a single dip, as described, will result in the deposit of approximately 3.5 grams of $BKNO_3$ on a flash igniter tube 28 that is eleven (11) inches (27.94 cm) in length and having an outside diameter of three-eighths ($\frac{3}{8}$) of an inch (0.95 cm). After being air dried, a second dip in tank 74 will add another coating of about 3.5 grams of $BKNO_3$ on the tube 28.

Figure 8:
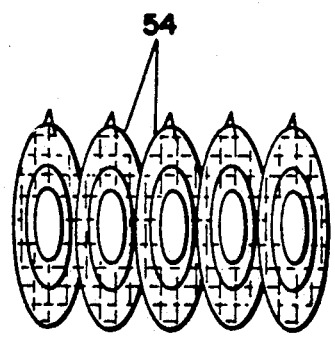
FIG. 8 illustrates an array of five (5) flash igniter disks that are to be treated in a BKNO₃ solution in a manner similar to the treatment given the flash igniter tubes of FIG. 7.

The flash igniter disks 54 may be made of 30 mesh carbon steel screen, being stamped and formed to an outer diameter of 1.40 inches (3.56 cm) with a hole having a diameter of 0.55 inches (1.40 cm). The disks 54 are ridge formed to a width of 0.06 inches (0.15 cm) and are also iron phosphate coated. The dip process for solution treating the flash igniter disks 54 may be similar to that for the flash igniter tubes 28. An array of five (5) flash igniter disks 54 awaiting such treatment is illustrated in FIG. 8.

In the operation of the inflator 10, the flash ignition system including the flash igniter tube 28, the flash igniter disks 54, and the initiator assembly 60 produces an instantaneous flash of fire to ignite the gas generant material 34. The flash of fire provides instant ignition to all pellets 52 of the gas generant material throughout the length of the gas generant chamber 42 simultaneously.

The system function is described by reference to FIG. 1. Electrical current supplied from a crash sensor (not shown) to the connector pins 64 of the squib 62 fires the initiator 60 into the explosive $BKNO_3$ powder. The fire is directed down the $BKNO_3$ solution dipped flash igniter tube 28 by the squib holder and base member 22. The rapid flash of fire from the flash igniter tube 28 ignites the $BKNO_3$ dipped igniter disks 54 and gas generant pellets 52 to produce a rapid generation of hot gas simultaneously along the length of the combustion chamber 42. The hot gas from the gas generant pellets 52 is cooled and filtered by the screen pack filtering assembly 48 prior to exiting the gas generator 10 through the exit outlets or holes 14 for airbag inflation.

It has been found that some configurations of the gas generator 10 can be made to operate successfully without using the dipped, that is, the solution treated flash igniter disks 54.

Thus, in accordance with the invention, there has been provided an improved ignition system, a flash ignition system, for passenger airbag gas generators which, typically, are elongated, which flash ignition system is operative to ignite the gas generant material uniformly throughout the length of the combustion chamber thereof. The flash ignition system of the invention is characterized by the ease of manufacture and the lower manufacturing cost thereof.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and their equivalents.

What is claimed is:

1. A flash ignition system for use in a gas generator that employs solid fuel gas generant material to effect the inflation of a protective bag to cushion a passenger from impact with the structure of a vehicle in the event of a crash, which gas generator includes a tubular housing having an elongated chamber therein containing the solid fuel gas generant material with the tubular portion of the housing having aperture means therein for directing generated gases to the protective bag, comprising:

an elongated perforated igniter tube positioned in the elongated chamber in the tubular housing with the solid fuel gas generant material therein distributed throughout the length of the chamber in surrounding relation to said igniter tube, said igniter tube having a first end and a second end and being composed of carbon steel with the surface thereof suitably primed to cause a coating of $BKNO_3$ to adhere thereto, which surface is provided with a further coating of $BKNO_3$ deposited thereon, means including explosive $BKNO_3$ powder positioned in the tubular housing adjacent the first end of said igniter tube, and initiator means for igniting the explosive $BKNO_3$ powder.

2. A flash ignition system for use in a gas generator, as defined by claim 1, wherein the surface of said igniter tube is primed by a coating of iron phosphate.

3. A flash ignition system for use in a gas generator as defined by claim 1, wherein the surface of said igniter tube is primed by being aluminized.

4. A flash ignition system for use in a gas generator, as defined by claim 1, wherein said igniter tube comprises an elongated, hollow, cylindrical body with perforations therein introduced by piercing the cylindrical wall thereof.

5. A flash ignition system for use in a gas generator, as defined by claim 1, wherein said igniter tube comprises carbon steel screen rolled and welded into a tube.

6. A flash ignition system for use in a gas generator, as defined by claim 1, and wherein the solid fuel gas generant employed in the gas generator is in the form of pellets.

7. A flash igniter system for use in a gas generator, as defined by claim 1, wherein the tubular housing for the gas generator is made of aluminum, further including a container holding ignitable auto ignition granules positioned in said tubular housing adjacent the second end of said igniter tube to effect ignition of the gas generant material when the tubular housing is subjected to a high temperature environment in the 350° F. range instead of the 650° F. range at which the gas generant material would ignite if said container were not provided.

8. A flash ignition system for use in a gas generator, as defined by claim 1, further including a plurality of igniter disks positioned in spaced relation along said elongated igniter tube, transversely thereof, in the elongated chamber in said tubular housing, said disks being made of iron phosphate coated carbon steel screen and provided with a further coating of $BKNO_3$ deposited thereon.

9. A flash igniter system for use in a gas generator, as defined by claim 8, wherein the tubular housing for the gas generator is made of aluminum, further including a container holding ignitable auto ignition granules positioned in said tubular housing adjacent the second end of said igniter tube to effect ignition of the gas generant material when the tubular housing is subjected to a high temperature environment in the 350° F. range instead of the 650° F. range at which the gas generant material would ignite if said container were not provided.

10. A flash igniter tube for use in a gas generator that employs solid fuel gas generant material to effect the inflation of a protective bag to cushion a passenger from impact with the structure of a vehicle in the event of a crash, which gas generator includes a tubular housing having an elongated chamber therein containing the solid fuel gas generant material with the tubular portion of the housing having an aperture therein for directing generated gases to the protective bag, comprising, an elongated perforated igniter tube positioned in the elongated chamber in the tubular housing with the solid fuel gas generator material therein distributed throughout the length of the chamber in surrounding relation to said igniter tube, said igniter tube having a first end and a second end and being composed of carbon steel with the surface thereof suitably primed to cause a coating of $BKNO_3$ to adhere thereto, which surface is provided with a further coating of $BKNO_3$ deposited thereon, and means including explosive $BKNO_3$ powder positioned in the tubular housing adjacent the first end of said igniter tube.

* * * * *

UNITED STATES PATENT AND TRADEMARK OFFICE
CERTIFICATE OF CORRECTION

PATENT NO. : 5,109,772
DATED : May 5, 1992
INVENTOR(S) : Donald J. Cunningham and Bradley W. Smith It is certified that error appears in the above-identified patent and that said Letters Patent is hereby corrected as shown below:

On the title page, line 10 of the abstract, "$BKNO_3$ dipped" should be -- $BKNO_3$ solution dipped --

Column 6, line 24, after "seconds," insert the phrase -- the array of flash igniter tubes 28 are retracted from --

Signed and Sealed this

First Day of March, 1994

*Attest:*

BRUCE LEHMAN

*Attesting Officer*   *Commissioner of Patents and Trademarks*